United States Patent [19]  [11] Patent Number: 4,695,295
Dorman et al. [45] Date of Patent: Sep. 22, 1987

[54] GAS SEPARATION MEMBRANES FROM POLYMERS CONTAINING A HYDROCARBON BACKBONE AND PENDANT (HYDROCARBYLAMIDO)ALKYL ESTER MOIETIES

[75] Inventors: Linneaus C. Dorman; Victor E. Meyer, both of Midland, Mich.; Marinda L. Wu, San Ramon, Calif.

[73] Assignee: The Dow Chemical Company, Midland, Mich.

[21] Appl. No.: 911,275

[22] Filed: Sep. 24, 1986

[51] Int. Cl.$^4$ .............................................. B01D 53/22
[52] U.S. Cl. ........................................ 55/16; 55/68; 55/158
[58] Field of Search ............... 55/16, 68, 158; 521/32, 521/139; 525/326.8, 327.6, 375

[56] References Cited

U.S. PATENT DOCUMENTS

| 3,758,629 | 9/1973 | Thill | 260/80.8 |
|---|---|---|---|
| 4,001,147 | 1/1977 | Chamberlin et al. | 260/2.5 B |
| 4,020,230 | 4/1977 | Mahoney et al. | 55/16 X |
| 4,033,731 | 7/1977 | Bargain et al. | 55/16 |
| 4,056,502 | 11/1977 | Gross | 260/29.6 |
| 4,082,658 | 4/1978 | Fritzsche et al. | 210/22 |
| 4,137,385 | 1/1979 | Reitz et al. | 525/327.6 |
| 4,156,597 | 5/1979 | Browall | 55/16 |
| 4,245,063 | 1/1981 | Thill et al. | 525/326.8 |
| 4,297,449 | 10/1981 | Goto et al. | 525/327.6 |
| 4,439,217 | 3/1984 | Yamabe et al. | 55/158 |
| 4,451,619 | 5/1984 | Heilmann et al. | 525/326.8 X |
| 4,486,554 | 12/1984 | Fazio | 525/326.8 X |
| 4,547,530 | 10/1985 | McCreedy et al. | 521/139 |
| 4,595,707 | 6/1986 | McCreedy et al. | 521/139 X |
| 4,608,419 | 8/1986 | Dorman et al. | 525/375 X |

FOREIGN PATENT DOCUMENTS

| 159505 | 10/1982 | Japan | 55/158 |
|---|---|---|---|
| 170910 | 10/1982 | Japan | 525/326.8 |
| 37024 | 3/1983 | Japan | 55/158 |
| 166903 | 10/1983 | Japan | 55/158 |
| 125210 | 7/1985 | Japan | 55/158 |

Primary Examiner—Robert Spitzer

[57] ABSTRACT

The invention relates to improved gas separation membranes fabricated from cyclic iminoether modified alpha-olefin/carboxylic acid copolymers. The modified membranes possess improved gas selectivities and/or permeabilities over the unmodified membranes. The membranes may be used to separate gas mixtures containing such gases as oxygen, nitrogen, methane, and carbon dioxide.

16 Claims, No Drawings

GAS SEPARATION MEMBRANES FROM POLYMERS CONTAINING A HYDROCARBON BACKBONE AND PENDANT (HYDROCARBYLAMIDO)ALKYL ESTER MOIETIES

BACKGROUND OF THE INVENTION

This invention relates to new gas separation membranes fabricated from copolymers containing a hydrocarbon backbone and pendant (hydrocarbylamido)alkyl ester moieties. This invnetion further relates to a method of separating gases using the novel membranes herein disclosed.

Membranes have been used to separate a variety of different gases, including hydrogen, helium, oxygen, nitrogen, carbon dioxide, methane, and light hydrocarbons. Particular applications of interest include obtaining an enriched oxygen stream from air for enhanced combustion or for increasing the efficiency of fermentation processes. Other applications include using membranes to obtain an enriched nitrogen stream from air for inert padding of flammable fluids or for food storage. Membranes may also be used in the separation of carbon dioxide and light hydrocarbons as part of the tertiary oil recovery process.

To separate a gas mixture, the gaseous components are contacted with one side of a semipermeable membrane through which at least one of the gaseous components selectively permeates. A gaseous component which selectively permeates through the membrane passes through the membrane more rapidly than the other component(s) of the mixture. The gas mixture is thereby separated into a portion which is enriched in the selectively permeating component(s) and a portion which is depleted in the selectively permeating component(s). A portion of the gas mixture which is depleted in the selectively permeating component(s) is enriched in the nonpermeating component(s). A nonpermeating component permeates more slowly through the membrane than the other component(s). The membrane material is chosen so that some degree of separation of the gas mixture can be obtained.

Membranes have been fabricated from a wide variety of polymeric materials. An ideal gas separation membrane possesses a high separation factor, high gas permeability, and good mechanical properties. Polymers possessing high separation factors (selectivities) generally have undesirably low permeabilities. Those polymers having high permeabilities generally have low separation factors. In the past, a choice between a high gas permeability and a high separation factor has been required. There is a present need to develop a membrane which possesses all three desired characteristics.

SUMMARY OF THE INVENTION

The present invention relates to novel membranes for gas separation which are fabricated from polymers containing a hydrocarbon backbone and pendant (hydrocarbylamido)alkyl ester moieties.

The present invention further relates to a method of separating gases comprising:

(a) contacting with a feed gas mixture under pressure one side of the semi-permeable membrane hereinbefore disclosed, (b) maintaining a pressure differential across the membrane under conditions such that a component(s) of the feed gas mixture selectively permeates through the membrane from the high pressure side to the low pressure side of the membrane, (c) removing the permeated gas which is enriched in the faster permeating component(s) from the low pressure side of the membrane, and (d) removing the nonpermeated gas which is depleted in the faster permeating component(s) from the high pressure side of the membrane.

The invention uses membranes which possess high gas selectivities to separate oxygen and nitrogen, carbon dioxide and methane, and other gas mixtures while maintaining reasonable gas permeabilities. The membranes useful in the invention also possess good mechanical properties and are readily fabricated.

DETAILED DESCRIPTION OF THE INVENTION

This invention relates to gas separation membranes fabricated from polymers containing a hydrocarbon backbone and pendant (hydrocarbylamido)alkyl ester moieties. The membranes of this invention are preferably fabricated from polymers which contain a hydrocarbon backbone and pendant carboxylic acid moieties wherein the pendant carboxylic acid moieties have been partially or fully reacted with a cyclic iminoether. A polymer with a hydrocarbon backbone refers to polymers which contain C and H in the main-chain. A pendant carboxylic acid group refers to a $-CO_2H$ group which is bound directly or indirectly to the main polymer chain. The polymers may be obtained by the copolymerization of unsaturated monomers containing pendant carboxylic acid moieties with alpha-olefins or vinyl monomers, wherein the pendant carboxylic acid moieties have preferably been reacted with a cyclic iminoether. The pendant groups thus contain hydrocarbylamido moieties. Hydrocarbylamido refers herein to an amido moiety

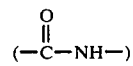

to which a hydrocarbyl moiety is bound. Hydrocarbyl refers to a moiety comprised of hydrogen and carbon.

Preferably, the membranes of the present invention are fabricated from polymers containing units in the backbone represented by formula (1):

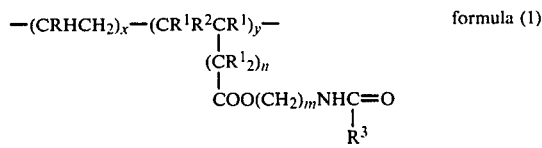

wherein x is individually in each occurrence an integer of from about 10 to about 40;

y is individually in each occurrence an integer of from about 1 to about 10;

n is individually in each occurrence an integer of from 0 to about 6;

m is an integer of from about 2 to about 7;

R and $R^1$ are H, an inertly substituted or unsubstituted alkyl, or an inertly substituted or unsubstituted aryl;

$R^2$ is H, an inertly substituted or unsubstituted alkyl, an inertly substituted or unsubstituted aryl, or a pendant moiety of the formula $-(CR_2^1)_n COOH$ or of the formula $-(CR_2^1)_n COO(CH_2)_m NHCOR^3$ wherein $R^1$, $R^3$, m and n are as hereinbefore defined;

$R^3$ is H, an inertly substituted or unsubstituted alkyl, or an inertly substituted or unsubstituted arylalkyl.

In formula (1) above, x is preferably an integer from about 15 to about 25. y is preferably an integer from about 1 to about 6; more preferably y is an integer from about 1 to about 2. n is preferably an integer from 0 to about 6, more preferably n is an integer from 0 to about 2. m is preferably an integer from about 2 to about 5, more preferably an integer from about 2 to about 3. R is preferably H, an inertly substituted or unsubstituted $C_{1-18}$ alkyl, an inerty substituted or unsubstituted $C_{6-14}$ aryl, or an inertly substituted or unsubstituted $C_{7-30}$ arylalkyl; more preferably, R is H, an inertly substituted or unsubstituted $C_{1-18}$ alkyl, or an inertly substituted or unsubstituted $C_{7-30}$ arylalkyl. $R^1$ is preferably H, an inertly substituted or unsubstituted $C_{1-18}$ alkyl, an inertly substituted or unsubstituted $C_{7-30}$ arylalkyl, or an inertly substituted or unsubstituted $C_{6-14}$ aryl; more preferably, $R^1$ is H, an inertly substituted or unsubstituted $C_{1-18}$ alkyl, or an inertly substituted or unsubstituted $C_{7-30}$ arylalkyl. $R^2$ is preferably H, an inertly substituted or unsubstituted $C_{7-30}$ arylaklyl, an inertly substituted or unsubstituted $C_{1-18}$ alkyl, an inertly substituted or unsubstituted $C_{6-14}$ aryl, or a pendant moiety of the formula $-(CR_2^1)_n COOH$ or of the formula $-(CR_2^1)_n COO(CH_2)_m NHCOR^3$ wherein $R^1$, $R^3$, m and n are as herein defined; more preferably, $R^2$ is H, an inertly substituted or unsubstituted $C_{1-18}$ alkyl, an inertly substituted or unsubstituted $C_{7-30}$ arylakyl, or a pendant moiety of the formula $-(CR_2^1)_n COOH$ or of the formula $-(CR_2^1)_n COO(CH_2)_m NHCOR^3$ wherein $R^1$, $R^3$, m and n are as herein defined. $R^3$ preferably is H, an inertly substituted or unsubstituted $C_{1-18}$ alkyl, or an inertly substituted or unsubstituted $C_{7-30}$ arylalkyl; more preferably, $R^3$ is H, an inertly substituted or unsubstituted $C_{1-18}$ alkyl, or an inertly substituted or unsubstituted benzyl; most preferably, $R^3$ is H, methyl, ethyl, n-propyl, n-butyl, n-pentyl, isoamyl, n-heptyl, n-heptadecyl, or benzyl. An inertly substituted group refers to a group which has replaced H in the alkyl or aryl and is unreactive under the conditions of fabrication and use. Examples of preferred inert substituents include $C_{1-18}$ alkyls, $C_{6-14}$ aryls, halides, and the like.

Such copolymers useful in the present invention should have adequate mechanical strength so that the membranes made from such copolymers do not fail under intended use conditions and possess reasonable lifetimes. The viscosity of the copolymers should be sufficiently low so that the copolymers can be processed in conventional extrusion equipment at reasonable temperatures. The copolymers preferably should be soluble in solvents which can be used for casting. Such solvents should be safe to handle under membrane fabrication conditions; that is, the solvents preferably possess low to moderate toxicity and moderate to high flash points.

Examples of copolymers preferred for modification with cyclic iminoethers include ethylene/acrylic acid, alpha-$C_{3-20}$ olefins/acrylic acid, styrene/acrylic acid, alpha-methyl styrene/acrylic acid, ethylene/methacrylic acid, alpha-$C_{3-20}$ olefins/methacrylic acid, styrene/methacrylic acid, alpha-methyl styrene/methacrylic acid, and the like. Examples of suitable terpolymers include ethylene/ acrylic acid/styrene, ethylene/acrylic acid/alpha-methyl styrene, ethylene/methacrylic acid/styrene, ethylene/methacrylic acid/alpha-methyl styrene, and the like. The production of the unmodified copolymers is described in the art. See *Encylopedia of Polymer Science and Technology*, Vol. 1, John Wiley and Sons, 1964, pp. 197–226, 246–328; *Encyclopedia of Chemical Technology*, Vol. 1, John Wiley and Sons, 1978, pp.386–408, and Ferdinand Rodriguez, *Principles of Polymer Systems*, 2nd edition, Hemisphere Publishing Company, McGraw-Hill, New York, 1982, pp. 417–423; incorporated herein by reference.

The polymers may be obtained by the copolymerization of unsaturated monomers which contain pendant carboxylic acid moieties represented by formula (2) with alpha-olefins or vinyl monomers of formula (3), wherein the pendant carboxylic acid moieties are preferably modified by reaction with a cyclic iminoether of formula (4).

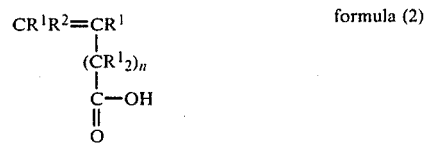

formula (2)

$$CRH=CH_2 \qquad \text{formula (3)}$$

formula (4)

wherein
R, $R^1$, $R^2$, $R^3$, m, and n are as previously defined.

Examples of preferred unsaturated monomers containing pendant carboxylic acid moieties include acrylic acid, methacrylic acid, crotonic acid, isocrotonic acid, cinnamic acid, maleic acid, fumaric acid, and the like.

Examples of preferred alpha-olefins or vinyl monomers include ethylene, propylene, butene-1, pentene-1, hexene-1, heptene-1, 3-methylbutene-1, 4-methyl-pentene-1, vinylcyclohexane, styrene, alpha-methylstyrene, and the like.

Examples of preferred cycylic iminoethers include 2-methyl-2-oxazoline, 2-ethyl-2-oxazoline, 2-(n-propyl)-2-oxazoline, 2-(n-butyl)-2-oxazoline, 2-(n-pentyl)-2-oxazoline, 2-isomamyl-2-oxazoline, 2-(n-heptyl)-2-oxazoline, 2-(n-hepta-decyl)-2-oxazoline, 2-phenyl-2-oxazoline, 2-methyl 5,6-dihydro-4H-1,3-oxazone, 2-ethyl 5,6-dihydro-4H-1,3-oxazine, and the like. The unmodified carboxylic acid containing copolymer is reacted with a cyclic iminoether. The general procedure of Witte and Seeliger, "Simple Synthesis of 2-Substituted 2-Oxazolines and 5,6-Dihydro-4H-1,3-Oxazines", Angew. Chem. Internat. Edit., Vol. 11, 287 (1972), incorporated herein by reference, may be used to synthesize the desired cyclic iminoethers. The method utilizes nitriles and ethanolamine with a cadmium acetate dihydrate, a zinc acetate dihydrate, or a zinc chloride catalyst to prepare the cyclic iminoethers.

The cyclic iminoether is reacted with the copolymer by first dissolving the polymer in a solvent. Preferred solvents include unsaturated chlorinated hydrocarbon solvents like tetrachloroethylene and aromatic chlorinated hydrocarbon solvents like chlorobenzene. The mixture is then heated to about 85 to about 110 degrees C under an inert gas while preferably mixing for about 10 to about 30 minutes. The cyclic iminoether in a like solvent is then added to the solvent/copolymer mixture while heating and preferably mixing. The mixture is heated to about 110 to about 125 degrees C. for about 48 to 72 hours to carry out the reaction. The copolymer reaction product is precipitated from the solution preferably using a $C_{1-2}$ alcohol or a $C_{5-7}$ saturated hydrocarbon, more preferably methanol. The copolymer reaction product is then preferably washed and dried.

The available pendant carboxylic acid moieties in such copolymers may be fully or only partially reacted with the cyclic iminoether. Different degrees of reaction of the cyclic iminoether with the available pendant carboxylic acid moieties may be obtained by controlling the reaction time or stoichiometry of the cyclic iminoether. Controling the stoichiometry of the cyclic iminoether is the preferred method for controlling the degree of reaction.

Especially preferred copolymers in the present invention are ethylene/acrylic acid (EAA) copolymers. The production of ethylene/acrylic acid copolymers is known and described in the art. See U.S. Pat. Nos. 3,520,861; 3,658,741; 3,884,857; 3,988,509; 4,248,990; 4,252,924; and 4,351,931; incorporated herein by reference. The EAA copolymers may be modified by reacting the pendant carboxylic acid moieties of the EAA with a cyclic iminoether. EAA copolymers containing any degree of acrylic acid content which can be produced is suitable for reaction with the cyclic iminoether, with up to a 35 wt % acrylic acid content being preferred, a 3 to 35 wt % acrylic acid content being more preferred, and a 3 to 30 wt % acrylic acid content being most preferred. The EAA copolymers may be reacted with the cyclic iminoethers as outlined in the procedure previously disclosed.

Membrane fabrication techniques for the cyclic iminoether modified copolymers are similar to those for the unmodified copolymers. Such membranes may be fabricated by a variety of methods, including solution casting, extrusion, compression molding, and the like. Conventional polyethylene film or fiber fabrication equipment can be used. Such techniques are known to one skilled in the art. Fabrication temperatures will vary depending upon the melt index and the acrylic acid content of the copolymer. The membranes may be produced in flat sheet or hollow fiber form as homogeneous, asymmetric, or composite membranes by methods described in the art.

The cyclic iminoether modified membranes may be formed by solution casting. Suitable solvents include chorinated hydrocarbon solvents such as perchloroethylene, chlorobenzene, tetrachloroethane, and the like. Such techniques are known to one skilled in the art. See Robert Kesting, *Synthetic Polymeric Membranes,* 2nd edition, John Wiley and Sons, 1985, incorporated herein by reference.

Composite membranes may be obtained by coating the cyclic iminoether modified copolymers onto a suitable substrate. The substrate may be porous or nonporous; preferably the substrate is porous so that the substrate presents minimal resistance to gas transport through the composite membrane. Conventional coating and lamination techniques may be adapted for use in fabrication of such membranes. Any polymeric material to which the cyclic iminoether modified copolymer will adhere, which possesses sufficient mechanical properties under membrane use conditions, and which does not unduly interfere with gas transport through the composite membrane may be used as a substrate for the composite membrane. Examples of preferred substrate materials include cellulose acetate, cellulose diacetate, cellulose triacetate, ethyl cellulose, polyamides, polyolefins, polyesters, polyurethanes, polysulfones, polyethersulfones, and the like.

Oxazoline modified EAA copolymers are especially preferred for this invention. Fabrication temperatures vary depending upon the melt index and the acrylic acid content of the copolymer. Compression molded films from the oxazoline modified EAA copolymers are preferably formed by compression molding at temperatures between about 150 to 180 degrees C., more preferably about 160 to 170 degrees C. Blown film from oxazoline modified EAA copolymers is preferably obtained by processing at temperatures of about 110 degrees C. to about 280 degrees C., more preferably from about 150 degrees C. to about 240 degrees C. Cast film is preferably obtained by processing at temperatures of about 110 degrees C. to about 280 degrees C., more preferably from about 150 degrees C. to about 240 degrees C. Chill roll temperatures of about 0 to about 25 degrees C. are preferred. Oxazoline modified EAA fibers preferably are extruded at temperatures of about 120 degrees C. to about 225 degrees C., more preferably from about 160 to about 205 degrees C.

An alternative method for fabricating the membranes which are the subject matter of the invention is to react the cyclic iminoether with the carboxylic acid containing polymer in an extruder. Films or fibers of the modified membranes can thus be directly produced without the need for an intermediate modification step prior to fabrication of the membranes. The advantages of this procedure is a substantial reduction in material handling and the reaction time required. Conventional extrusion equipment may be used to carry out the procedure. For high conversion of the carboxylic acid moieties, the carboxylic acid containing polymer and the cyclic iminoether are preferably reacted together in a twin screw extruder. The cyclic iminoether is preferably introduced into the barrel at a point close to the polymer feed so as to maximize residence time and mixing in the extruder. The extrusion temperature preferably ranges from about 120 degrees C. to about 240 degrees C., more preferably from about 160 degrees C. to about 240 degrees C. Residual unreacted cyclic iminoether is preferably removed in a subsequent vacuum devolatilization step.

The cyclic iminoether modified membranes are fabricated into flat sheet or hollow fiber devices by methods described in the art. The membranes are sealingly engaged in a pressure vessel such that the membrane surface separates the vessel into two fluid regions wherein fluid flow between the two regions is accomplished by fluid permeating through the membrane. See U.S. Pat. Nos. 3,228,876; 3,422,008; 3,455,460; 3,475,331; 3,526,001; 3,538,553; 3,690,465; 3,702,658; 3,755,034; 3,801,401; 3,872,014; 3,966,616; 4,045,851; 4,061,574; 4,080,296; 4,083,780; 4,220,535; 4,235,723; 4,265,763; 4,430,219; 4,351,092; 4,337,139; and 4,315,819 incorporated herein by reference.

The cyclic iminoether modified membranes are used to separate gas mixtures such as oxygen and nitrogen or carbon dioxide and methane. One side of the membrane is contacted with a feed gas under pressure, while a pressure differential is maintained across the membrane. At least one of the components in the gas mixture selectively permeates through the membrane. The component(s) of the feed gas which selectively permeates through the membrane passes through the membrane from the high pressure side to the low pressure side of the membrane such that a stream is obtained on the low pressure side of the membrane which is enriched in the faster permeating gas. The permeated gas is removed from the low pressure (downstream) side of the membrane. A stream depleted in the faster permeating gas is withdrawn from the high pressure (upstream) side of the membrane. In the case where oxygen is separated from nitrogen, oxygen selectively permeates through the membrane and the pressure differential across the membrane is preferably between about 50 and 250 psi. For the separation of carbon dioxide and methane, carbon dioxide selectively permeates through the membrane and the pressure differential across the membrane is preferably between about 50 and 850 psi. Such gas separation processes may take place at temperatures which do not adversely affect the membrane. The temperature preferably ranges between about 0 degrees C. and about 150 degrees C.

Gas permeability is defined as $$P = \frac{(\text{amount of permeant})(\text{membrane thickness})}{(\text{area})(\text{time})(\text{driving force gradient across the membrane})}$$

A standard permeability measurement unit is $\frac{cm^3 \ (STP) \ cm}{cm^2 \ s \ cmHg}$.

The separation factor (selectivity) is defined as the ratio of the permeability of the faster permeating gas to the permeability of the slower permeating gas.

The cyclic iminoether modified membrane has an oxygen permeability of at least about $2.0 \times 10(-10)$ cm$^3$(STP) cm/(cm$^2$ s cmHg), more preferably of at least about $2.5 \times 10(-10)$ cm$^3$(STP) cm/(cm$^3$ s cmHg). The separation factor for oxygen/nitrogen of at least about 2.5, more preferably of at least about 3.0. The modified membrane has a permeability for carbon dioxide of at least about $10 \times 10(-10)$ cm$^3$(STP) cm/(cm$^2$ s cmHg). The separation factor for carbon dioxide/methane is preferably at least about 5.0.

SPECIFIC EMBODIMENTS

The following examples are presented to illustrate the invention only and are not intended to limit the scope of the invention or claims. Percentages are by weight unless otherwise indicated. The gas separation properties of the EAA and oxazoline modified EAA membranes are measured using a constant volume-variable pressure gas permeation apparatus. Literature sources describe such apparatus and measurement techniques. See *Methods of Experimental Physics*, Vol. 16c, Academic Press, Inc. 1980, pp. 315-377 and Pye, Hoehn, and Panar, "Measurement of Gas Permeability of Polymers. I. Permeabilities in Constant Volume/Variable Pressure Apparatus," *Journal of Applied Polymer Science*, Vol. 20, 1976, pp. 1921-1931, incoporated herein by reference. The membrane sample size is 3.9 cm or 11.0 cm in diameter. Permeability values are determined at about 25 degrees C. with a 50 psi pressure differential across the membrane.

Examples 1-8 illustrate the synthesis method for 2-substituted-2-oxazolines and are not directed to the claimed invention.

EXAMPLE 1

Preparation of 2-Methyl-2-Oxazoline

A mixture of about 50.0 grams (1.22 mole) acetonitrile, about 61.1 grams (1.0 mole) ethanolamine, and about 6.2 grams (0.025 mole) cadmium acetate dihydrate is heated and stirred at reflux under nitrogen for about two days. During this time, the reflux temperature rises from about 83 degrees C. to about 103 degress C. The product is distilled under nitrogen at atmospheric pressure using a 6 inch Vigreaux column. The fraction boiling at about 101 degrees C. to about 103 degrees C. is collected for use in the copolymer modification reaction.

EXAMPLE 2

Preparation of 2-(n-Propyl)-2-Oxazoline

A mixture of about 69.1 grams (1.00 mole) butyroitrile, about 64.8 grams (1.05 mole) ethanolamine, and about 6.2 grams (0.025 mole) cadmium acetate dihydrate is heated from about 122 degrees C. to about 130 degrees C. and stirred under nitrogen for about two days. The product is then distilled under vacuum. The fraction boiling at about 66 degrees C. to about 69 degrees C. at about 48 mmHg to about 50 mmHg is collected for later use.

EXAMPLE 3

Preparation of 2-(n-Butyl)-2-Oxazoline

A mixture of about 83.1 grams (1.00 mole) valeronitrile, about 64.8 grams (1.05 mole) ethanolamine, and about 6.2 grams (0.025 mole) cadmium acetate dihydrate is heated at about 124 degrees C. to about 128 degrees C. and stirred under nitrogen for about two days. The product is then distilled under vacuum. The fraction boiling at about 67 degrees C. to about 75.5 degrees C. at about 28 mmHg is collected.

EXAMPLE 4

Preparation of 2-Isoamyl-2-Oxazoline

A mixture of about 50.g grams (0.515 mole) isoamyl cyanide, about 31.5 grams (0.515 mole) ethanolamine, and about 3.2 grams (0.012 mole) cadmium acetate dihydrate is heated to about 115 degrees C. to about 125 degrees C. and stirred under nitrogen for about two days. The product is distilled under vacuum and the fraction boiling at about 81 degrees C. to about 84 degrees C. at about 29 mmHg is collected.

EXAMPLE 5

Preparation of 2-(n-Pentyl)-2-Oxazoline

A mixture of about 3.24 grams cadmium oxide, about 3.00 grams acetic acid, about 64.8 grams ethanolamine, and about 98.2 grams hexanenitrile is heated and stirred under nitrogen at about 120 degrees C. to 125 degrees C. for about two days. The liquid is decanted from the catalyst and distilled under vacuum. The fraction boiling at about 86 degrees C. to about 93 degrees C. at about 28 mmHg to about 30 mm Hg is collected.

EXAMPLE 6

Preparation of 2-(n-Heptyl)-2-Oxazoline

A mixture of about 100.0 grams (0.774 mole) of heptylcyanide, about 47.3 grams (0.774 mole) ethanolamine, and about 4.8 grams (0.019 mole) cadmium acetate dihydrate is heated to about 120 degrees C. to about 130 degrees C. for about 2 days. The mixture is distilled under vacuum and the fraction boiling at about 109 degrees C. to about 116 degrees C. at about 28 mmHg is collected for later use.

EXAMPLE 7

Preparation of 2-Heptadecyl-2-Oxazoline

A stirred mixture of about 50.0 grams (0.19 mole) stearonitrile, about 11.7 grams (0.19 mole) ethanolamine, and about 1.2 grams (0.0048 mole) cadmium acetate dihydrate is heated at about 115 degrees C. to about 125 degrees C. under nitrogen for about 88 hours. The mixture is cooled and then dissolved in about 450 ml of methylene chloride and dried over magnesium sulfate. The mixture is then filtered. Residual solvent is removed from the filtrate by vacuum. About 58.6 grams of light yellow solid is obtained. The solid is recrystallized from about 300 ml of hexane. The recrystallized material is collected, washed, and dried, yielding about 4.7 grams with a melting point of about 77 degrees C. to about 90 degrees C. The resulting filtrate, rinses, material removed in the initial filtration step and about 200 ml additional hexane are combined, heated, and filtered using gravity. The product is stored in a refrigerator for several days. The formed crystals are collected, rinsed, and dried at 50 degrees C. under vacuum, yielding about 36.3 grams of white solid with a melting point of about 50 degrees C. to about 54 degrees C.

EXAMPLE 8

Preparation of 2-Phenyl-2-Oxazoline

A mixture of about 104.1 grams (1.0 mole) benzonitrile, about 63.1 grams (1.03 mole) ethanolamine, and about 6.2 grams (0.025 mole) cadmium acetate dihydrate is heated and stirred at about 125 degrees C. to about 130 degrees C. under nitrogen for about two days. The product is distilled under vacuum and the fraction boiling at about 120 degrees C. to about 121 degrees C. at 16 mmHg is collected.

EXAMPLE 9

Modification of EAA Copolymer (9% Acrylic Acid) with 2-Alkyl-2-Oxazolines

The reaction vessel consists of a 500 ml, three necked, roundbottomed flask equipped with a thermometer, air stirring assembly and Teflon propeller, and a condenser connected to a nitrogen bubbler. About 30.0 grams EAA copolymer (containing 9% acrylic acid) and about 100 ml of chlorobenzene are mixed in the reactor under nitrogen at about 95 degrees C. To the ensuing gel is added a solution of the oxazoline (about 0.041 mole) from Examples 1-7 in about 10 ml of chlorobenzene. The mixture is stirred and heated at about 114 to about 125 degrees C. for about two to about three days. The reaction mixture is then transferred to a liter beaker while still hot. Polymer product is precipitated from the warm mixture with about 800 to about 1000 ml of methanol. The polymer product is chopped in a Waring Blendor, collected on a filter, washed with methanol, and dried under vacuum at about 70 to about 80 degrees C. An IR scan is obtained to confirm the conversion of the —COOH group of the copolymer to —COOCH$_2$CH$_2$NHCOR$^3$.

EXAMPLE 10

Modification of EAA Copolymers (6.5%, 9.0%, 20.0%, and 29.6% Acrylic Acid) with 2-Ethyl-2-Oxazoline The reaction vessel consists of a one liter, three-necked roundbottom flask equipped with a thermometer, air stirrer and Teflon propeller, and a condenser with a drying tube (CaCl$_2$). The the reaction vessel is added about 25.0 grams of 6.5% acrylic acid EAA copolymer and about 200 grams of 2-ethyl-2-oxazoline (a commercial product of The Dow Chemical Company). The mixture is stirred and heated at about 120 degrees C. to about 125 degrees C. for about 24 hours. The reaction mixture is then transferred while hot to a 2 liter beaker and cooled in an ice bath under nitrogen. At about 60 degrees C., the mixture is diluted with methanol while stirring. The mixture is further mixed in a Waring Blendor, chilled in ice water for 30 minutes, collected on a Buchner funnel, washed with methanol, and the resulting granular solid dried under vacuum for about 20 hours at about 70 degrees C.

For conversion of the 9% acrylic acid EAA copolymer, about 200 grams of 9% acrylic acid EAA copolymer is reacted with about 800 ml of 2-ethyl-2-oxazoline for about 200 hours at about 120 to 125 degrees C. The product is dried for about 56 hours at about 100 to 105 degrees C.

For the conversion of the 20% acrylic acid EAA copolymer, the general method described above is followed except to the reaction vessel is added about 50.0 grams of 20% acrylic acid EAA copolymer and about 200 grams of 2-ethyl-2-oxazoline. The mixture is stirred and heated at about 110 degrees C. to about 112 degrees C. for about 21 hours. The mixture is transferred and at about 35 degrees C. precipitated with about 1250 ml of methanol. The resulting granular solid is dried in vacuo for about 24 hours at about 65 degrees C. to about 80 degrees C.

For conversion of the 29.6% acrylic acid EAA copolymer, the initial step of the general procedure previously outlined is followed except 50.0 grams of 29.6% acrylic acid EAA copolymer is added to the reaction vessel. The reaction mixture is stirred and heated at about 127 to 128 degrees C. for about 1.8 hours. The mixture is transferred to a roundbottomed flask and freed of the bulk of 2-ethyl-2-oxazoline in vacuo with the aid of a rotary evaporator at a maximum bath temperature of about 50 degrees C. Vacuum at about 0.6 to 0.7 mm Hg is continued for 4.5 hours at about 50 degrees C. The residue adheres to the walls of the flask. The polymer is covered with hexane and the flask sealed and allowed to stand overnight. The product is removed with the aid of a spatula and transferred to a crystallizing dish. Residual hexane and oxazoline are removed by heating in vacuo. The product is removed from the glass dish while warm and cooled on a stainless steel surface. The product is then dried in a glass jar for about 20 hours at about 85 degrees C. to about 90 degrees C.

EXAMPLE 11

Modification of EAA Copolymer (9% and 20% Acrylic Acid) with 2-Phenyl-2-Oxazoline The experimental set up as described in Example 9 is used.

For modification of the 9 wt % acrylic acid EAA copolymer, about 6.03 grams (0.041 mole) of 2-phenyl- 2-oxazoline (prepared in Example 8 above) in about 10 ml of chlorobenzene is added to about 30.0 grams of 9 wt % acrylic acid EAA copolymer in about 100 ml of chlorobenzene. The mixture is stirred and heated at about 120 degrees C. to about 125 degrees C. for about 2 days. The polymer reaction product is precipitated from solution with methanol, washed, and dried as described in Example 9.

For modification of the 20 wt % acrylic acid EAA copolymer, about 14.0 grams (0.095 mole) of 2-phenyl-2-oxazoline (prepared in Example 9 above) in about 10 ml of chlorobenzene is added to about 30.0 grams of 20 wt % acrylic acid EAA copolymer in about 100 ml of chlorobenzene. The mixture is stirred and heated at about 125 degrees C. to about 127 degrees C. for about 3 days. The polymer reaction product is precipitated from solution with methanol, washed, and dried as described in Example 9.

EXAMPLE 12

Preparation of 2-Alkyl-2-Oxazoline Modified EAA Membranes

Membranes of 2-alkyl-2-oxazoline modified EAA copolymers (prepared in Examples 1-7, 9, 10 (9% acrylic acid) above) are fabricated by compression molding. A sample of the modified EAA is placed between two sheets of Teflon or Mylar, which are in turn placed between aluminum foil and stainless steel platens. A ram press is preheated to 160–170 degrees C. The platens containing the modified EAA are placed in the ram press for 4 minutes, then the press is pressurized to 40,000 psi. The press is cooled to room temperature and the ram pressure released. Thin films of the modified EAA are obtained.

Gas permeability values and separation factors of the films fabricated by the above procedure are shown in Tables I and II.

TABLE I $O_2/N_2$ Separation Performance of 2-Alkyl-2-Oxazoline Modified EAA Membranes

| Alkyl Group | $O_2/N_2$ Separation Factor | Permeability$^{vp}$ × $10^{10}$ $\frac{cm^3 (STP) \, cm}{cm^2 \, s \, cmHg}$ | |
|---|---|---|---|
| | | $O_2$ | $N_2$ |
| EAA* | 2.92 | 2.42 | 0.83 |
| Methyl | 3.39 | 2.00 | 0.59 |
| Ethyl | 3.06 | 2.39 | 0.78 |
| n-Propyl | 2.97 | 2.95 | 0.99 |
| n-Butyl | 3.13 | 3.75 | 1.2 |
| n-Pentyl | 3.08 | 3.71 | 1.2 |
| Isoamyl | 3.33 | 3.67 | 1.1 |
| n-Heptyl | 3.07 | 3.99 | 1.3 |
| Heptadecyl | 3.17 | 2.11 | 0.66 |

*unmodified EAA (91% ethylene/9% acrylic acid)
$^{vp}$constant volume-variable pressure technique

TABLE II $CO_2/CH_4$ Separation Performance of 2-Alkyl-2-Oxazoline Modified EAA Membranes

| Alkyl Group | $CO_2/CH_4$ Separation Factor | Permeability × $10^{10}$ $\frac{cm^3 (STP) \, cm}{cm^2 \, s \, cmHg}$ | |
|---|---|---|---|
| | | $CO_2$ | $CH_4$ |
| EAA*$^{vv}$ | 6.4 | 8.21 | 1.29 |
| n-Ethyl$^{pv}$ | 6.9 | 21.5 | 3.10 |
| n-Ethyl$^{vp}$ | 5.8 | 12.5 | 2.17 |
| n-Pentyl$^{vp}$ | 5.4 | 18.2 | 3.39 |

*unmodified EAA (91% ethylene/9% acrylic acid)
$^{pv}$constant pressure-variable volume technique
$^{vp}$constant volume-variable pressure technique

What is claimed is:

1. A gas separation membrane comprising a semipermeable membrane fabricated from a polymer containing a hydrocarbon backbone and pendant (hydrocarbylamido)alkyl ester moieties.

2. The membrane of claim 1 wherein the semipermeable membrane is fabricated from a polymer containing units in the backbone described by the formula:

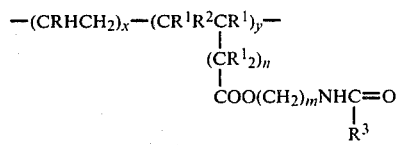

wherein
R is H, an inertly substituted or unsubstituted $C_{1-18}$ alkyl, an inertly substituted or unsubstituted $C_{7-30}$ arylalkyl, or an inertly substituted or unsubstituted $C_{6-14}$ aryl;

$R^1$ individually in each occurrence is H, an inertly substituted or unsubstituted $C_{1-18}$ alkyl, an inertly substituted or unsubstituted $C_{7-30}$ arylalkyl, or an inertly substituted or unsubstituted $C_{6-14}$ aryl;

$R^2$ is H, an inertly substituted or unsubstituted $C_{1-18}$ alkyl, an inertly substituted or unsubstituted $C_{7-30}$ arylalkyl, or an inertly substituted or unsubstituted $C_{6-14}$ aryl, or a pendant moiety of the formula $-(CR_2^1)_n COOH$ or of the formula $-(CR_2^1)_n COO(CH_2)_m NHCOR^3$;

$R^3$ is H, an inertly substituted or unsubstituted $C_{1-18}$ alkyl, or an inertly substituted or unsubstituted $C_{7-30}$ arylalkyl;

x is individually in each occurrence an integer from about 10 to about 40;

y is individually in each occurrence an integer from about 1 to about 10;

m is individually in each occurrence an integer from about 2 to about 7;

n is individually in each occurrence an integer from 0 to about 6.

3. The membrane of claim 2 wherein x is an integer between about 15 and about 25; y is an integer between about 1 and about 6.

4. The membrane of claim 3 wherein $R^3$ is H, an inertly substituted or unsubstituted $C_{1-18}$ alkyl, or an inertly substituted or unsubstituted benzyl.

5. The membrane of claim 4 wherein
$R^1$ individually in each occurrence is H, an inertly substituted or unsubstituted $C_{1-18}$ alkyl, or an inertly substituted or unsubstituted $C_{7-30}$ arylaklyl;

$R^2$ is H, an inertly substituted or unsubstituted $C_{1-18}$ alkyl, an inertly substituted or unsubstituted $C_{7-30}$ arylalkyl, or a pendant moiety of formula —$(CR_2^1)_n COOH$ or of the formula —$(CR_2^1)_n COO(CH_2)_m NHCOR^3$.

6. The membrane of claim 5 wherein R is H, an inertly substituted or unsubstituted $C_{1-18}$ alkyl, or an inertly substituted or unsubstituted benzyl.

7. A method of separating gases comprising the steps of
   (a) contacting with a feed gas mixture under pressure one side of a semipermeable membrane comprising a membrane fabricated from a polymer containing a hydrocarbon backbone and pendant (hydrocarbylamido)alkyl ester moieties;
   (b) maintaining a pressure differential across the membrane under conditions such that a component(s) of the feed gas mixture selectively permeates through the membrane from the high pressure side to the low pressure side of the membrane,
   (c) removing the permeated gas which is enriched in the faster permeating component(s) from the low pressure side of the membrane; and
   (d) removing the nonpermeated gas which is depleted in the faster permeating component(s) from the high pressure side of the membrane.

8. The method of claim 7 wherein the membrane is fabricated from a polymer containing units in the backbone described by the formula

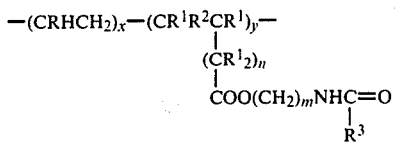

wherein
R is H, an inertly substituted or unsubstituted $C_{1-18}$ alkyl, an inertly substituted or unsubstituted $C_{7-30}$ arylalkyl, or an inertly substituted or unsubstituted $C_{6-14}$ aryl;
$R^1$ individually in each occurrence is H, an inertly substituted or unsubstituted $C_{1-18}$ alkyl, an inertly substituted or unsubstituted $C_{7-30}$ arylalkyl, or an inertly substituted or unsubstituted $C_{6-14}$ aryl;
$R^2$ is H, an inertly substituted or unsubstituted $C_{1-18}$ alkyl, or an inertly substituted or unsubstituted $C_{6-14}$ aryl, an inertly substituted or unsubstituted $C_{7-30}$ arylalkyl, or a pendant moiety of the formula —$(CR_2^1)_n COOH$ or of the formula —$(CR_2^1)_n COO(CH_2)_m NHCOR^3$;
$R^3$ is H, an inertly substituted or unsubstituted $C_{1-18}$ alkyl, or an inertly substituted or unsubstituted $C_{7-30}$ arylalkyl;
x is individually in each occurrence an integer from about 10 to about 40;
y is individually in each occurrence an integer from about 1 to about 10;
m is individually in each occurrence an integer from about 2 to about 7;
n is individually in each occurrence an integer from 0 to about 6.

9. The method of claim 8 wherein x is an integer between about 15 and about 25; y is an integer between about 1 and about 6.

10. The method of claim 9 wherein $R^3$ is H, an inertly substituted or unsubstituted $C_{1-8}$ alkyl, or an inertly substituted or unsubstituted benzyl.

11. The method of claim 10 wherein $R^1$ individually in each occurrence is H, an inertly substituted or unsubstituted $C_{1-18}$ alkyl, or an inertly substituted or unsubstituted $C_{7-30}$ arylalkyl; $R^2$ is H, an inertly substituted or unsubstituted $C_{1-18}$ alkyl, an inertly substituted or unsubstituted $C_{7-30}$ arylalkyl, or a pendant moiety of the formula —$(CR_2^1)_n COOH$ or of the formula —$(CR_2^1)_n COO(CH_2)_m NHCOR^3$.

12. The membrane of claim 11 wherein R is H, an inertly substituted or unsubstituted $C_{1-18}$ alkyl, or an inertly substituted or unsubstituted benzyl.

13. The method of claim 12 wherein the feed gas mixture contains at least one of the gases chosen from the group of oxygen, nitrogen, methane, or carbon dioxide.

14. The method of claim 13 wherein the separation factor for oxygen/nitrogen is at least 3.0.

15. The method of claim 14 wherein the pressure differential across the membrane is between about 50 psi to about 850 psi.

16. The method of claim 15 wherein the temperature is between about 0 degrees C. and about 150 degrees C.

* * * * *